United States Patent
Liu et al.

(10) Patent No.: US 11,013,017 B2
(45) Date of Patent: May 18, 2021

(54) METHODS AND NETWORK NODES FOR ALLOCATING RESOURCES FOR MULTIPLE RADIO LINKS

(71) Applicant: Telefonaktiebolaget LM Ericsson (publ), Stockholm (SE)

(72) Inventors: Jinhua Liu, Beijing (CN); Virgile Garcia, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/572,332

(22) PCT Filed: May 7, 2015

(86) PCT No.: PCT/CN2015/078434
§ 371 (c)(1),
(2) Date: Nov. 7, 2017

(87) PCT Pub. No.: WO2016/176852
PCT Pub. Date: Nov. 10, 2016

(65) Prior Publication Data
US 2018/0124809 A1    May 3, 2018

(51) Int. Cl.
*H04W 72/12*    (2009.01)

(52) U.S. Cl.
CPC ... *H04W 72/1242* (2013.01); *H04W 72/1226* (2013.01)

(58) Field of Classification Search
CPC ............................................. H04W 72/1242
See application file for complete search history.

(56) References Cited

U.S. PATENT DOCUMENTS

| 6,842,783 B1* | 1/2005 | Boivie | H04L 41/0896 370/235 |
|---|---|---|---|
| 2004/0017825 A1* | 1/2004 | Stanwood | H04W 72/1236 370/468 |

(Continued)

FOREIGN PATENT DOCUMENTS

| CN | 1714580 A | 12/2005 |
|---|---|---|
| CN | 102960041 A | 3/2013 |

(Continued)

OTHER PUBLICATIONS

PCT Notification of Transmittal of the International Search Report and the Written Opinion of the International Searching Autoyhrity, or the Declaration for International application No. PCT/CN2015/078434—dated Feb. 16, 2016.

(Continued)

*Primary Examiner* — Christopher M Crutchfield
*Assistant Examiner* — Tito Q Pham
(74) *Attorney, Agent, or Firm* — Baker Botts, LLP

(57) ABSTRACT

Disclosed are methods and network nodes for allocating resources for multiple radio links in a wireless communication system. The method may include successively performing each of multiple scheduling loops such that the resources with one or more of multiple resource types are allocated to one or more radio links selected from the multiple radio links, wherein each of the multiple scheduling loops is associated with the one or more of multiple types of the resources. With the proposed methods and network nodes, radio resources of different types may be effectively and efficiently allocated to multiple radio links through multiple scheduling loops and utilization efficiency of the resources could be notably boosted.

14 Claims, 5 Drawing Sheets

Frame for UL&DL link of UE 1

Frame for UL & DL link of UE 2

▨ Dedicated-type resource
▩ Opportunistic/shared-type resource
▦ Unused-type resource

(56) References Cited

U.S. PATENT DOCUMENTS

| | | | | |
|---|---|---|---|---|
| 2008/0025301 | A1* | 1/2008 | Lenzini | H04L 47/50 370/389 |
| 2008/0181173 | A1* | 7/2008 | Wei | H04L 47/14 370/329 |
| 2009/0016290 | A1* | 1/2009 | Chion | H04W 72/1289 370/329 |
| 2009/0040937 | A1* | 2/2009 | Xhafa | H04L 41/5003 370/252 |
| 2009/0154487 | A1* | 6/2009 | Ryan | H04L 12/4035 370/445 |
| 2009/0279496 | A1* | 11/2009 | Raissi-Dehkordi | H04W 16/04 370/329 |
| 2010/0260113 | A1 | 10/2010 | Liu et al. | |
| 2010/0262695 | A1* | 10/2010 | Mays | G06F 11/3433 709/226 |
| 2013/0188564 | A1* | 7/2013 | Yu | H04W 72/1247 370/329 |
| 2014/0029627 | A1* | 1/2014 | Kumar | H04L 47/22 370/419 |

FOREIGN PATENT DOCUMENTS

| | | |
|---|---|---|
| CN | 103220114 A | 7/2013 |
| WO | 2005 055533 A1 | 6/2005 |
| WO | 2009 024911 A2 | 2/2009 |
| WO | 2011 099824 A3 | 8/2011 |
| WO | 2015 058005 A3 | 4/2015 |
| WO | 2016 086408 A1 | 6/2016 |

OTHER PUBLICATIONS

Extended European Search Report for Application No./Patent No. 15891104.0-1215 / 3292722 PCT/CN2015078434—dated Mar. 22, 2018.

Communication Pursuant to Article 94(3) EPC for Application No. 15 891 104.0-1215—dated Jan. 30, 2019.

Examination Report issued by Intellectual Property India for Application No. 201717036935—dated Jul. 31, 2020.

Chinese Office Action issued for Application No. 201580079672.9—dated Jan. 26, 2021.

* cited by examiner

METHODS AND NETWORK NODES FOR ALLOCATING RESOURCES FOR MULTIPLE RADIO LINKS

PRIORITY

This nonprovisional application is a U.S. National Stage Filing under 35 U.S.C. § 371 of International Patent Application Serial No. PCT/CN2015/078434 filed May 7, 2015, and entitled "Methods And Network Nodes For Allocating Resources For Multiple Radio Links."

TECHNICAL FIELD

The exemplary embodiments of the present disclosure relate generally to wireless communication field and, more specifically, relate to methods and network nodes for allocating resources for multiple radio links in a wireless communication system.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

Mobile communication technologies are now evolving to very high frequencies, larger carrier bandwidths, very high data rates and multiple heterogeneous layers. The future mobile networks are likely to be a combination of evolved 3G technologies, 4G technologies and emerging or substantially new components such as Ultra-Density Network ("UDN"), which is also referred to as mmW-radio access technology ("RAT"). Due to the increasing demand for wireless capacity enhancement and the lack of availability of spectrum in the lower frequency range (e.g., 800 MHz~3 GHz), the use of frequencies in 10 GHz range is being investigated and higher frequency bands, for instance, in the range of 30 GHz, 60 GHz and 98 GHz for future mobile networks are also explored. At these high frequency bands, a very large bandwidth of spectrum could be obtained. This means that both operating frequency and bandwidth for the future mobile networks are expected to be much higher than those used in the legacy mobile networks. However, due to large signal attenuation with respect to path loss, the network operating over such high frequencies is supposed to cover small areas with densely deployed radio access nodes ("ANs") or access points ("APs"), such as base stations, thereby providing sufficient coverage for indoor/hot areas.

It has been proposed that the total carrier bandwidth of the mmW-RAT may be up to 1 or 2 GHz. This bandwidth may be composed of a number of sub-band carriers of a certain bandwidth, for example, 100 MHz. By way of example, FIG. 1a schematically illustrates one mmW-RAT carrier with 4 sub-bands in a frequency domain (vertical axis) and with 12 sub-frames in a time domain (horizontal axis). The smallest resource grid in the time-frequency domain is an Atomic Scheduling Unit ("ASU") as illustrated in FIG. 1a.

Scheduling based resource allocation, i.e., scheduled Media Access Control ("MAC"), has been proposed as one possible radio resource allocation approach for the mmW-RAT. For an easy understanding of this scheduled MAC approach, FIG. 1b schematically illustrates a wireless communication system 10 in which the scheduled MAC may be implemented.

As illustrated in FIG. 1b, the wireless communication system 10 includes, among other things, a Central Control Unit ("CCU") 11, a number of Access Nodes ("ANs") 12-15, and a number of user equipments ("UEs") 16-21, wherein the CCU may communicatively connect with multiple ANs and each AN may wirelessly serve multiple UEs within its coverage area. The CCU 11 is responsible for determining a frame, which may also be referred to as a template frame, for each radio link based on measurements and data rate requests from peer nodes of each radio link, for example, an uplink ("UL") and a downlink ("DL") of the UE 16 and an uplink and a downlink of the UE 17. The frame may be configured to indicate, for each radio link, multiple types of resources with different degrees of availabilities, which are illustrated in detail in FIG. 3.

As illustrated in FIG. 3, two different template frames are formed, the top one being directed to UE 1, which may be equivalent to UE 16 in FIG. 1b, and the below one being directed to UE 2, which may be equivalent to UE 17 in FIG. 1b. As can be seen from each template frame, three different types of the resources with respective different availabilities are depicted with respective filled patterns for DL and UL transmission of the UEs.

Specifically, dedicated-type resources are exclusively used by a specific radio link to provide reliable UL/DL data transmission with no significant interference. Opportunistic/shared-type resources are shared between different coexisting radio links and supposed to boost the user data rate when necessary, possibly with interference coming from nearby ongoing communications. Unused-type resources are those resources that are prohibitive for utilization by a certain link, for example via the CCU's initial decision, and may be temporally available for the certain link after the AP's resource coordination among multiple radio links. For example, for a pair of radio links, that is, a first radio link (e.g., DL of the UE 1) and a second radio link (e.g., DL of the UE 2), the unused-type resources, which cannot be used by the second radio link and therefore should be considered as prohibitive for the second radio link, may be dedicated-type resources to be used by the first radio link, as depicted in FIG. 3. Upon the resource coordination, for example, by collecting resource information from other UEs and ANs, the AN may know that the first radio link does not fully use its dedicated-type resources, which are unused-type resources for the second radio link, and therefore may schedule data originated from the second radio link to transmit over its unused-type resources.

Per the CCU shared by a cluster of access nodes, the resources are allocated to different radio links with template frames. The template frame may be updated by the CCU during the session according to various variations such as interference measurements and data rate requests from interactive neighboring radio links.

It is to be understood from the depiction of FIG. 3 that there are multiple radio resource types in the mmW-RAT system for a radio link with template-frame based scheduled MAC and every radio link may be scheduled with one or more types of radio resources. Although the template frame may be configured separately for each radio link and thereby it is straightforward that a radio link should use its own dedicated resources first, it is still insufficient in determining which radio link should be scheduled. That is, the resource availabilities conveyed by the template frame alone cannot determine which radio link should be scheduled and which resource should be allocated for a scheduled radio link when multiple candidate radio links are available to be scheduled.

For example, in an example scenario in which the AN may only have 2 radio frequency ("RF") chains and the DL radio link and UL radio link are served by the different RF chains, in case of high gain analog beamforming is applied in AN side, the AN can only generate up to 2 beam lobes in two different directions and thereby can only serve up to 2 UL or DL radio links in the different directions. Hence, the AN would have to select up to 2 radio links with the same UL or DL direction even though there are 4 candidate radio links with their respective dedicated resources as conveyed by the template frame. Further, the configuration of the template frame cannot indicate which radio link should use which part of resources once for all, especially for the opportunistic/shared-type and unused-type resources whose utilization are flexible and changing, and for the dedicated-type resources which may become useable by other neighboring radio links after scheduling.

In addition, the scheduling priority and resource allocation for the radio link using opportunistic/shared-type resources and/or unused-type resources may be different from those for the dedicated-type resources, since opportunistic/shared-type and/or unused-type resources are shared among neighboring radio links while the dedicated-type resources are dedicated for a certain radio link. Additionally, different types of resources for one link may correspond to different data transmission reliabilities due to interference differences. For instance, a first radio link having better radio quality than a second radio link over the respective dedicated-type resources does not necessarily mean that the first radio link also has better radio quality than the second radio link over the opportunistic/shared-type resources.

In view of the above, how to efficiently schedule and allocate radio resources for candidate radio links in a wireless communication system using, for example, mmW-RAT should be addressed.

SUMMARY

It is an object of the present disclosure to at least address the problems outlined above, and to provide methods and network nodes as follows.

According to an aspect of the present disclosure, there is provided a method implemented by a network node for allocating resources for multiple radio links in a wireless communication system. The method comprises successively performing each of multiple scheduling loops such that the resources with one or more of multiple resource types are allocated to one or more radio links selected from the multiple radio links, wherein each of the multiple scheduling loops is associated with the one or more of multiple types of the resources.

According to another aspect of the present disclosure, there is provided a network node for allocating resources for multiple radio links in a wireless communication system. The network node comprises a processor and a memory, the memory containing instructions executable by the processor, whereby the network node is operative to successively perform each of multiple scheduling loops such that the resources with one or more of multiple resource types are allocated to one or more radio links selected from the multiple radio links, wherein each of the multiple scheduling loops is associated with the one or more of multiple types of the resources.

According to another aspect of the present disclosure, there is provided a network node for allocating resources for multiple radio links in a wireless communication system. The network node comprises processing means operative to successively perform each of multiple scheduling loops such that the resources with one or more of multiple resource types are allocated to one or more radio links selected from the multiple radio links, wherein each of the multiple scheduling loops is associated with the one or more of multiple types of the resources.

According to the solutions set forth in the above aspects of the present disclosure and those as discussed hereinafter, a resource type specific scheduling loop scheme is proposed and implemented at the network node. Thereby, radio resources of different types may be effectively and efficiently allocated to multiple radio links through multiple scheduling loops and utilization efficiency of the resources could be notably boosted.

BRIEF DESCRIPTION OF THE DRAWINGS

In the following, the disclosure will be discussed in greater detail by means of exemplary embodiments with reference to the accompanying drawings, in which.

Like reference numerals denote like elements throughout the present specification.

DETAILED DESCRIPTION

Figure 1A:
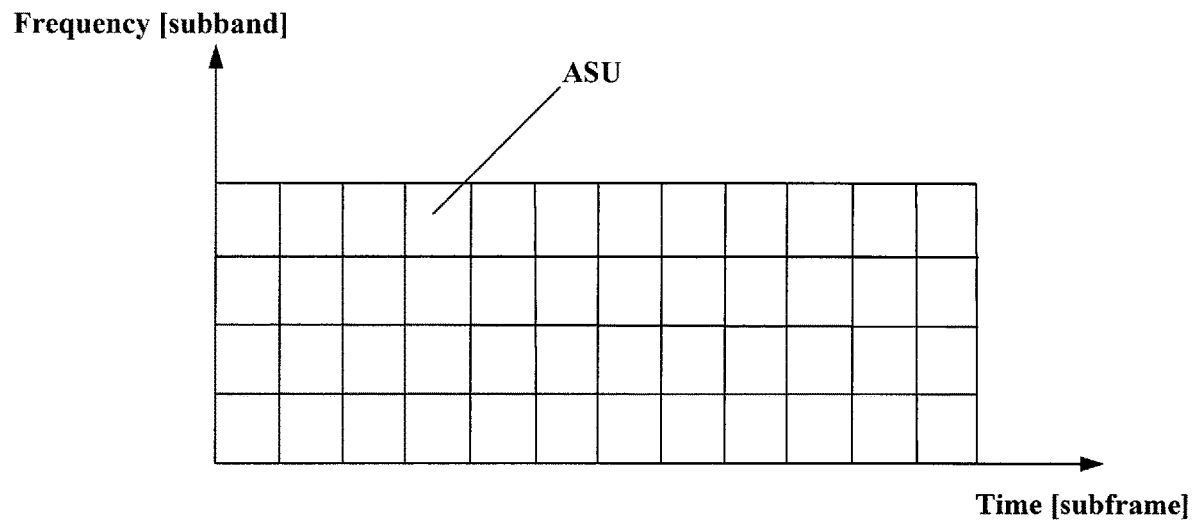
FIG. 1a is a schematic diagram illustrating one mmW-RAT carrier with 4 subbands in time and frequency domains.

The present disclosure will now be described more detail hereinafter with reference to the accompanying drawings, in which certain embodiments of the present disclosure are shown. This disclosure may, however, be embodied in many different forms and should not be construed as limited to the embodiments set forth herein; rather, these embodiments are provided by way of example so that this disclosure will be thorough and complete, and will fully convey the scope of the present disclosure to those skilled in the art.

Generally, all terms used in the claims are to be interpreted according to their ordinary meaning in the technical field, unless explicitly defined otherwise herein. For example, the user equipment in the present disclosure may be any terminal capable of receiving information from and/or transmitting information to the network, connectable to the network wirelessly. Examples of a network node may refer to any suitable radio access point or access node, for example a radio base station ("BS") according to any suitable communication standard, such as a Node B ("NB") or an evolved NB ("eNB"), for carrying out the solutions as discussed in detail later with reference to the accompanying drawings.

All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The discussion above and below in respect of any of the aspects of the present disclosure is also in applicable parts relevant to any other aspect of the present disclosure.

As mentioned before, FIG. 1b illustrates a schematic wireless communication system 10 and certain embodiments of the present disclosure may be practiced in this system 10. For example, the present disclosure proposes that the AN as shown in FIG. 1b may perform multiple resource type specific scheduling loops for scheduled MAC of mmW-RAT such that multiple types of radio resources may be allocated to candidate radio links served by the AN in an optimal way. In one embodiment, the multiple scheduling loops may be applied to multiple types of radio resources respectively and one scheduling loop may be responsible for allocating one type of radio resources. As an alternative, one scheduling loop may also be responsible for allocating two or more types of radio resources. In another words, allocation of some types of the radio resources could be completed via a single scheduling loop. In one embodiment, the scheduling priority may be determined or calculated for each scheduling loop in which the scheduling priority for each candidate radio link to access different types of radio resources should also be calculated. In another embodiment, when calculating the scheduling priority for each scheduling loop, the scheduling results of the previous scheduling loops may be taken into account.

Although the embodiments of the present disclosure are discussed in the context of the template based MAC in mmW-RAT system where there are radio link specific template frames configured by a CCU to regulate radio resource allocations performed by the AN for all served candidate radio links, it should be noted that the applicable context or environment of the present disclosure should not be limited to this specific form. A person skilled in the art is able to understand that the embodiments of the present disclosure may be applicable in any other suitable system in which different types of radio resources are present and need to be allocated.

Figure 1B:
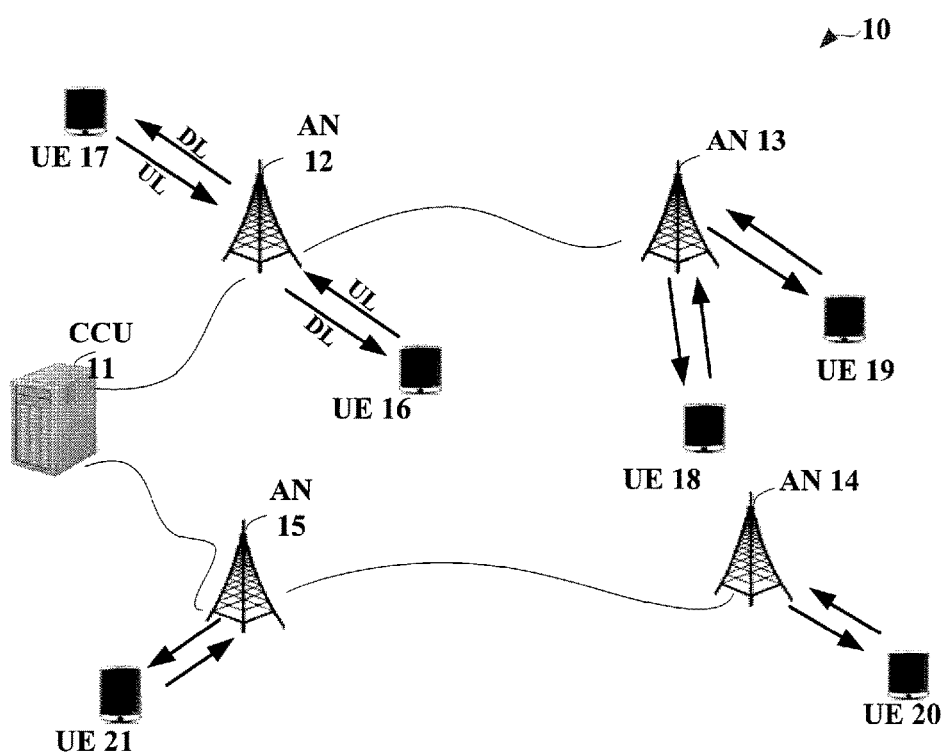
FIG. 1b is a schematic wireless communication system in which certain embodiments of the present disclosure may be practiced.
Figure 2:
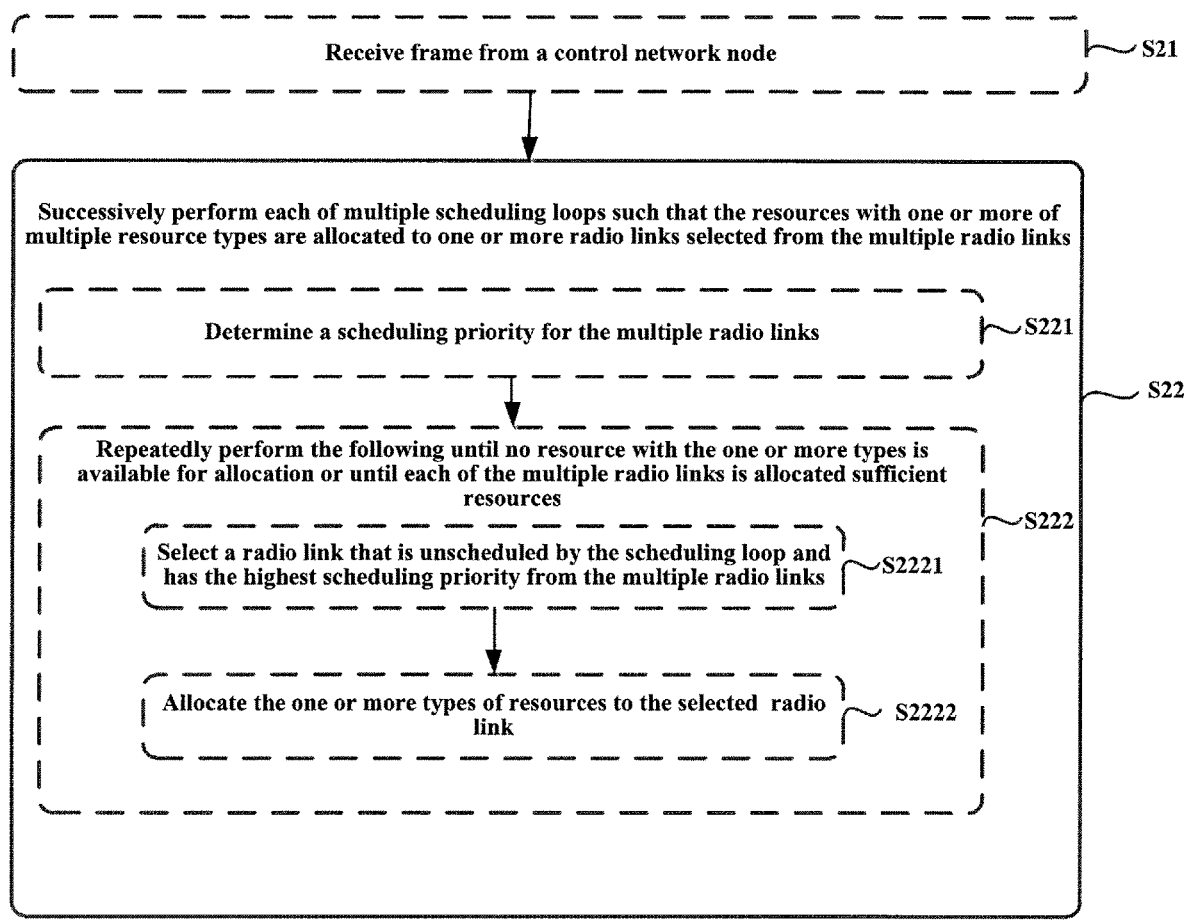
FIG. 2 is a logic flow diagram exemplarily illustrating a method for allocating resources for multiple radio links in the wireless communication system illustrated in FIG. 1b, according to certain embodiments of the present disclosure.
Figure 3:
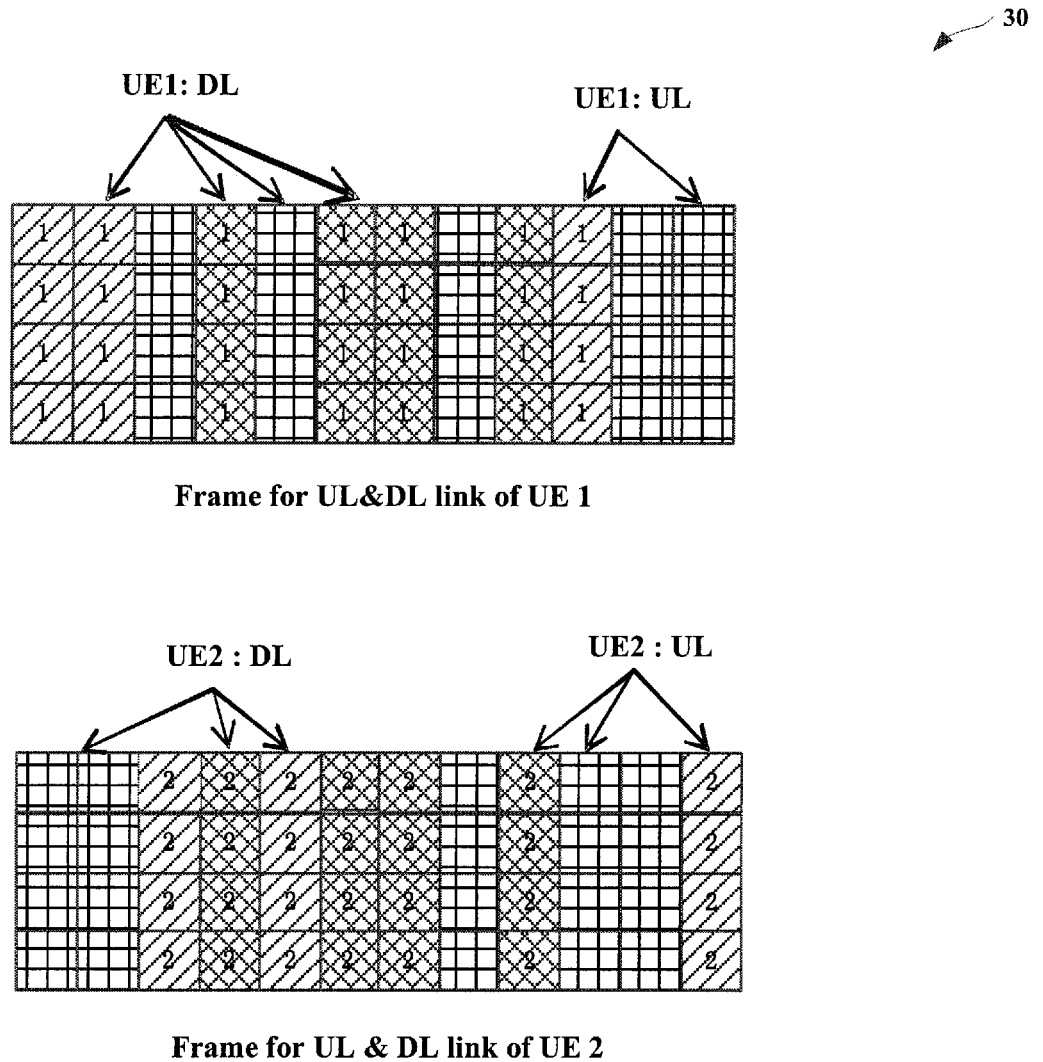
FIG. 3 is a schematic diagram illustrating frames for conveying resource allocations with respect to multiple user equipments according to certain embodiments of the present disclosure.
Figure 3:
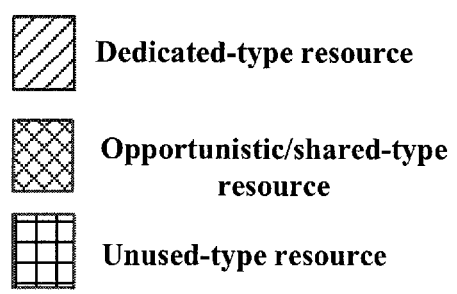

FIG. 2 is a logic flow diagram exemplarily illustrating a method 20 for allocating resources for multiple radio links in the wireless communication system 10 illustrated in FIG. 1, according to certain embodiments of the present disclosure. The method 20 may be implemented by the AN as shown in FIG. 1b.

As illustrated in FIG. 2, the method 20 comprises successively performing, at S22, each of multiple scheduling loops such that the resources of one or more of multiple resources types are allocated to one or more radio links selected from the multiple radio links, wherein each of the multiple scheduling loops is associated with the one or more of multiple types of the resources.

In one embodiment, the number of the scheduling loops is determined based on the number of the resource types. In this manner, multiple scheduling loops may be applied for multiple types of radio resource respectively and therefore one scheduling loop may be responsible for allocating one specific type of radio resources. Additionally or alternatively, one scheduling loop may also be capable of allocating more than one type of radio resources to multiple radio links. In other words, the allocation of two or more types of radio resources may be completed by sharing the same scheduling loop. In one embodiment, a CCU may configure which types of the radio resources may share one scheduling loop.

In one embodiment, the sequence for performing multiple scheduling loops may be pre-defined or pre-determined by, for example, a CCU. For example, the multiple scheduling loops may be performed successively or according to a pre-defined order.

In one embodiment in which the multiple resource types of the resources are conveyed by a frame with respect to each of the multiple radio links, the method 20 may further include, receiving the frame from a CCU at S21. As discussed before, the frame herein may be a template frame, which may be determined by the CCU for each radio link based on, for example, the measurements and data rate requests from peer nodes of each radio link. Further, the template frame may be updated by the CCU during the session according to various variations such as interference measurements and data rate requests from interactive neighboring radio links. For example, the CCU may update the template frames for multiple radio links based on the feedbacks from the hosted ANs.

In one embodiment, the successively performing each of the multiple scheduling loops at S22 may comprise determining, at S221, a scheduling priority for the multiple radio links and repeatedly performing, at S222, the following S2221 and S2222, until no resource with the one or more types is available for allocation or until each of the multiple radio links is allocated sufficient resources. As shown, at S2221, the method 20 may select a radio link that is unscheduled by the scheduling loop and has the highest scheduling priority from the multiple radio links and at S2222, the method 20 may allocate the one or more types of resources to the selected radio link.

In one embodiment, determining the scheduling priority for the multiple radio links at S221 may comprise calculating the scheduling priority based on one or a combination of the following coefficients associated with the multiple radio links: traffic handling priorities, link channel quality, link fairness, link delay, and link minimum rates. The following will illustrate further details of these example coefficients, which may be flexibly considered in determining the scheduling priority.

Coefficient of traffic handling priority $f(Type_{Traffic})$

This scheduling priority for a UE may be determined by its traffic type and the corresponding Quality of Service ("QoS") requirement. For instance, the traffic handling priorities in priority descending order can be voice, video, interactive and background services. That is, the voice type traffic may have the highest priority, the video and interactive type services may have medium priority and the background type traffic may have the lowest priority. The 'f( )' means a function, which may be equally applicable to the coefficients listed below.

Coefficient of link channel quality $f(K_{cqi}CQI)$ $K_{cqi}$ is a configurable factor regarding Channel Quality Indicator ("CQI"). Typically, this priority for a UE may be proportional to the channel quality of the UE. Thus, the higher a CQI is, the higher a value of $f(K_{cqi}CQI)$ would be.

Coefficient of link fairness $$f\left(\frac{K_{rate}}{\text{Rate}}\right)$$

$K_{rate}$ is a configurable rate specific factor and Rate represents an achieved rate by a UE. With regard to the factor $K_{rate}$, the scheduling priority for a UE may be in inverse proportional to the achieved rate by the UE. Thus, the scheduling priority of a UE with a lower rate may be increased when a rate difference between UEs is increased.

Coefficient of link delay $$f\left(\frac{K_D}{D-D_{max}}\right)$$

$K_D$ is a configurable delay specific factor, $D_{max}$ is a maximum allowable packet queuing time in a MAC TX buffer for a UE, and D is a queuing delay of a next packet in the MAC TX buffer for this UE. The coefficient has a very high value when the queue delay is larger than the maximum allowable delay.

Coefficient of link minimum rate f(max(Kmin(Rmin–Rate), 0))

$K_{min}$ is a configurable factor regarding a minimum rate, Rmin is a required minimum rate to ensure minimum acceptable user experience. The coefficient has a high value when the user experienced rate is lower than the minimum rate.

The above gives some example coefficients that may be used for calculating the scheduling priority. It is to be understood that the scheduling priority for a UE may be a multiplication or sum of selected coefficients from above example coefficients according to different conditions. In one embodiment, the scheduling priority is dependent on a tradeoff between an individual user experience and system performance. For example, a scheduling priority P for a best-effort service may take one of the following forms:

Maximum CQI dependence: for instance, $P=f(K_{cqi}CQI)$, which merely takes the channel quality into account;

Proportional fair:

$$P = f(K_{cqi}CQI)f\left(\frac{K_{rate}}{\text{Rate}}\right),$$

which takes both the CQI and link or user fairness into account; and

Minimum rate scheduler: $P=f(K_{cqi}CQI)$ f(max(Kmin (Rmin-Rate), 0)), which takes both the CQI and the link minimum rate into account.

In one or more embodiments, the scheduling loops are operated sequentially and the next scheduling loop is carried out based on accumulated radio resource allocation results of one or more previous scheduling loops. In view of this, the above coefficients associated with the multiple radio links may comprise one or more of the following factors associated with the previously scheduled radio links:

a transmitter buffer status, including queuing delay and the amount of buffered data, updated based on the resource allocation results from the one or more previous scheduling loops. During the MAC TX buffer status estimation for the next scheduling loop, the buffered TX data, which is to be carried by the resources allocated by the previous scheduling loops, should be excluded.

a data rate obtained from previous transmissions and scheduled transmissions based on the resource allocation results from the one or more previous scheduling loops. In another word, the data rate estimation for the next scheduling loop should consider both the achieved data rate in the previous transmissions and the contribution of the scheduled transmissions by the previous scheduling loops; and a service type after scheduled based on the resource allocation results from the one or more previous scheduling loops. In particular, if there are multiple services for one radio link and the data of a high priority service may be fully carried by the allocated resources in the previous scheduling loops, the resource type applied for scheduling priority calculation for the next scheduling loop should be the highest priority service which may still have data in the TX buffer.

According to the above descriptions made with reference to FIG. 2, it is to be understood that the present disclosure proposes a resource-type specific scheduling loop scheme in the AN for a wireless system with different types of radio resources, such as the scheduled MAC in mmW-RAT system. With the proposed multiple-loop scheduling scheme, the capability of QoS management, fairness management and resource efficiency optimization, which are inherited capabilities of scheduling based MAC may be achieved.

Figure 4:
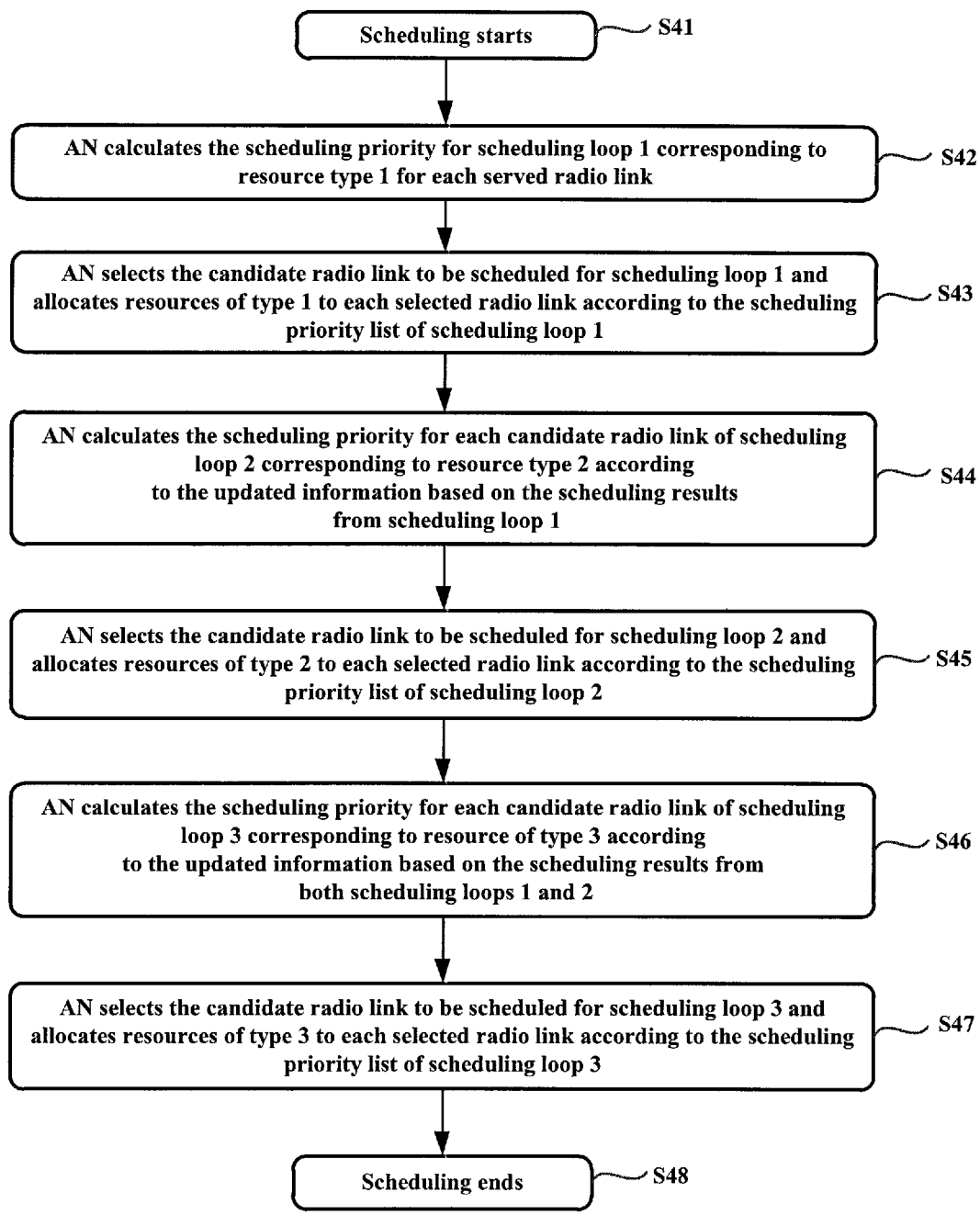
FIG. 4 is a detailed logic flow diagram exemplarily illustrating a method for allocating resources for multiple radio links according to certain embodiments of the present disclosure.

FIG. 4 is a detailed logic flow diagram exemplarily illustrating a method 40 for allocating resources for multiple radio links according to certain embodiments of the present disclosure. In particular, FIG. 4 illustrates one example scenario with three scheduling loops in the mmW-RAT system, wherein loop 1 is for dedicated-type ("type 1") resources, loop 2 is for unused-type ("type 2") resources and loop 3 is for opportunistic/shared-type ("type 3") resources. Similar to the existing scheduling schemes, periodical scheduling may be operated for the mmW-RAT system. However, different from the existing scheduling schemes, there may be multiple resource-type specific scheduling loops in the mmW-RAT system and all of the multiple scheduling loops should be run once and sequentially in each scheduling period. Therefore, the scheduling loops herein may be operated in the order of the loop 1, the loop 2 and the loop 3 according to the criteria described before.

As illustrated in FIG. 4, at S41, the scheduling operations start, for example, at the beginning of a new scheduling period or cycle. Then, at S42, the AN may calculate a scheduling priority for scheduling loop 1 corresponding to resource type 1 for each served radio link, thereby obtaining a scheduling priority list of the scheduling loop 1. The calculation herein may be based on one or a combination of the coefficients as discussed before, such as the traffic handling priorities, the link channel quality, the link fairness, the link delay, and the link minimum rates.

Then, at S43, the AN may select the candidate radio links to be scheduled for the scheduling loop 1 and allocates dedicated-type resources to each selected candidate radio links according to a scheduling priority list of the scheduling loop 1. For example, the AN may rank the candidate radio links in the descending order according to the scheduling priority value calculated for each candidate radio link and then sequentially allocate the resources to these candidate radio links until all dedicated-type resources are allocated or all the candidate radio links are allocated corresponding dedicated-type resources.

Then the flow proceeds to S44, at which the AN may calculate a scheduling priority for each candidate link of the scheduling loop 2 corresponding to the unused-type resources according to the updated information based on the scheduling results from the scheduling loop 1, thereby obtaining a scheduling priority list of the scheduling loop 2. The updated information herein may be one or a combination of: 1) the transmitter buffer status, including queuing delay and the amount of buffered data, updated based on the resource allocation results from the one or more previous scheduling loops; 2) the data rate obtained from previous transmissions and scheduled transmissions based on the resource allocation results from the one or more previous scheduling loops; 3) the service type after scheduled based on the resource allocation results from the one or more previous scheduling loops, as discussed before.

After that, at S45, the AN may select candidate radio links to be scheduled for scheduling loop 2 and allocates the unused-type resources to each selected radio link according to the scheduling priority list of the scheduling loop 2. Again, the allocation of the unused-type resources will keep performing until the unused-type resources are completely allocated (i.e., no unused-type resource is left) or all the candidate radio links are allocated sufficient resources (i.e., the candidate radio links have enough resources after the allocation).

Then, at S46, the AN may calculate a scheduling priority for each candidate link of the scheduling loop 3 corresponding to the opportunistic/shared-type resources according to the updated information based on the scheduling results from the scheduling loops 1 and 2, thereby obtaining a scheduling priority list of the scheduling loop 3. In other words, the updated information herein may take into account the scheduling results of the scheduling loops 1 and 2 when determining the scheduling priority list of the scheduling loop 3.

After that, at S47, the AN may select candidate radio links to be scheduled for scheduling loop 3 and allocates the opportunistic/shared-type resources to each selected radio link according to the scheduling priority list of the scheduling loop 3. Again, the allocation of the opportunistic/shared-type resources will be continuously performed until the opportunistic/shared-type resources are completely allocated or all the candidate radio links are allocated sufficient resources.

Finally, the scheduling operations end at S48.

Although the scheduling operations as discussed above are in the sequence of the scheduling loops 1, 2 and 3, this sequence is merely for illustrative purposes. A person skilled in the art may change or modify this sequence based on the teaching of the embodiments of the present disclosure. For example, in one embodiment, the scheduling loop 1 may be performed first when allocating the dedicated-type radio resources first is desirable and then either one of the scheduling loops 2 and 3 may immediately be performed based on the scheduling results of the previously-performed scheduling loop 1.

Further, according to different network scenarios and different operator configurations, different coefficients as mentioned before may be used for different scheduling loops. For example, if the network capacity is sufficient for all the candidate radio links, then the coefficient of link fairness $$f\left(\frac{K_{rate}}{\text{Rate}}\right)$$

could be used for all scheduling loops in determining respective scheduling priority lists. In contrast, if the network capacity is insufficient for all the candidate radio links, for example after the first scheduling loop, then the coefficients of the link channel quality $f(K_{cqi}\text{CQI})$ may be applied for the remaining scheduling loops, such as the scheduling loops 2 and 3. In addition, for each subsequent scheduling loop, the scheduling results of the previously-performed scheduling loops may take into account when calculating the scheduling priority. For example, when calculating the scheduling priority for one candidate radio link in the present scheduling loop, the transmitter buffer status of this candidate radio link updated based on one or more previous scheduling loops should be taken into account. That is, it should consider how much data is currently left in the TX buffer after the previous scheduling loops when determining the priority list.

From the above descriptions made with reference to FIG. 4, it can be seen that the present disclosure proposes a new scheduling priority being derived for each candidate radio link based on the accumulated scheduling results of all the previous scheduling loops. In this manner, the resource allocation may be efficiently and effective conducted, thereby improving the resource utilization efficiency and avoiding potential interference from neighboring radio links.

Figure 5:
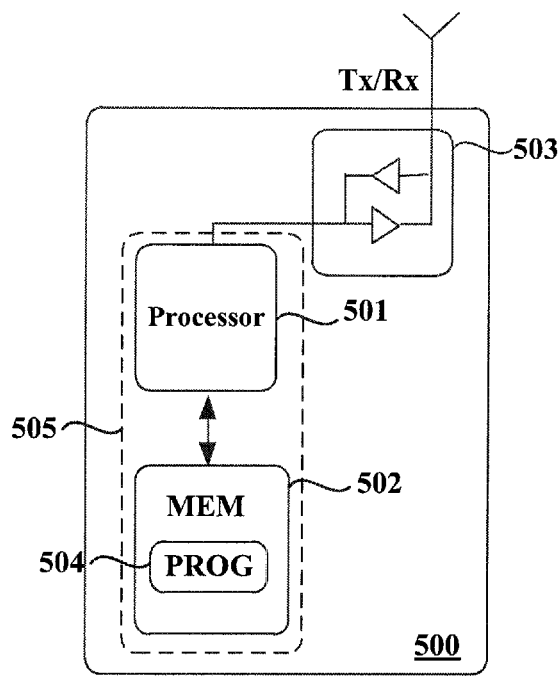
FIG. 5 is a schematic block diagram showing a network node suitable for implementing certain embodiments of the present disclosure.

FIG. 5 is a schematic block diagram showing a network node 500, for example, an access node, suitable for implementing some exemplary embodiments of the present disclosure detailed herein.

As illustrated in FIG. 5, the network node 500 includes at least one processor 501, such as a data processor, at least one memory (MEM) 502 coupled to the processor 501, and a suitable RF transmitter TX and receiver RX 503 coupled to the processor 501. The MEM 502 stores a program (PROG) 504. The transmitter/receiver 503 is for bidirectional wireless communications with multiple UEs (not shown) via an air interface.

The PROG 504 is assumed to include instructions that, when executed by the processor 501, enable the network node 500 to operate in accordance with the example embodiments of the present disclosure, as discussed herein with the methods 20 and 40. For example, the network node 700 may be embodied as a Base Station ("BS"), an eNB, an AP, an AN, or a part thereof, to carry out the corresponding steps directed thereto as discussed in the methods 20 and 40.

In general, the example embodiments of the present disclosure may be implemented by computer software executable by at least one processor 501 of the network node 500, or by hardware, or by a combination of software and hardware.

In addition, the at least one processor 501 and the memory 502 may be combined as processing means 505 operative to perform the relevant steps as illustrated in the methods 20 and 40 with respect to the network node 500.

The MEM 502 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the network node 500, there may be several physically distinct memory units in each of them. The processors 501 may be of any type suitable to the local technical environment, and may include one or more of general purpose computers, special purpose computers, microprocessors, digital signal processors (DSPs) and processors based on multicore processor architecture, as non-limiting examples. The network node 500 may have multiple processors, such as for example an application specific integrated circuit chip that is slaved in time to a clock which synchronizes the main processor.

The techniques described herein may be implemented by various means so that an apparatus implementing one or more functions of a corresponding mobile entity described with an embodiment comprises not only prior art means, but also means for implementing the one or more functions of a corresponding apparatus described with an embodiment and it may comprise separate means for each separate function, or means may be configured to perform two or more functions.

Figure 6:
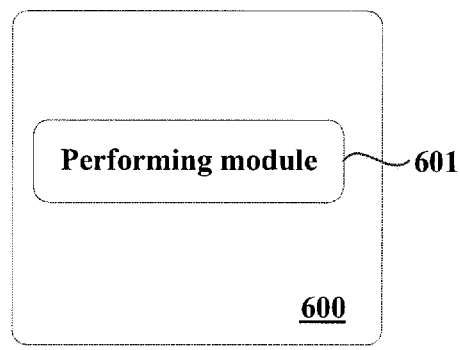
FIG. 6 is another schematic block diagram showing a network node suitable for implementing certain embodiments of the present disclosure detailed herein.

FIG. 6 is a schematic block diagram showing a network node 600 suitable for implementing some exemplary embodiments of the present disclosure detailed herein.

As illustrated in FIG. 6, the network node 600 may include a performing module 601 configured to successively perform each of multiple scheduling loops such that the resources with one or more of multiple resource types are allocated to one or more radio links selected from the multiple radio links, wherein each of the multiple scheduling loops is associated with the one or more of multiple types of the resources. In one embodiment, the performing module 601 is further configured to determine a scheduling priority for the multiple radio links and repeatedly perform the following until no resource with the one or more types is available for allocation or until each of the multiple radio links is allocated sufficient resources: selecting a radio link that is unscheduled by the scheduling loop and has the highest scheduling priority from the multiple radio links; and allocating the one or more types of resources to the selected radio link.

It is to be understood that the network node 600 may perform operations in accordance with the example embodiments of the present disclosure, as discussed herein with the methods 20 and 40.

The foregoing has described various aspects and embodiments of the present disclosure. Many modifications and other embodiments of the disclosures set forth herein will come to mind to one skilled in the art to which these embodiments of the disclosure pertain having the benefit of the teachings presented in the foregoing descriptions and the associated drawings. Therefore, it is to be understood that the embodiments of the disclosure are not to be limited to the specific embodiments disclosed and that modifications and other embodiments are intended to be included within the scope of the appended claims. Although specific terms are employed herein, they are used in a generic and descriptive sense only and not for purposes of limitation.

Although various aspects of the invention arc set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method implemented by a network node for allocating resources for multiple radio links in a wireless communication system, the method comprising:
successively performing each of multiple scheduling loops such that the resources with one or more of multiple resource types are allocated to one or more radio links selected from the multiple radio links,
wherein performing each of the multiple scheduling loops comprises performing a first scheduling loop, performing a second scheduling loop, and performing a third scheduling loop, wherein the first scheduling loop is associated with one of a dedicated resource type, a shared resource type, and an unused resource type, and the second scheduling loop is associated with a different resource type from the resource type associated with the first scheduling loop, wherein the second scheduling loop is associated with one of the dedicated resource type, the shared resource type, and the unused resource type, and the third scheduling loop is associated with a different resource type from the resource types associated with the first scheduling loop and the second scheduling loop, wherein the third scheduling loop is associated with one of the dedicated resource type, the shared resource type, and the unused resource type,
wherein the dedicated resource type comprises a resource that is used exclusively by a specific radio link,
wherein the shared resource type comprises a resource that is shared between different coexisting radio links, and
wherein the unused resource type comprises a resource that is prohibitive for utilization by a certain link according to an initial decision of a control network node but is temporarily available for the certain link after resource coordination by the network node among multiple radio links.

2. The method according to claim 1, wherein the number of the scheduling loops is determined based on the number of the resource types.

3. The method according to claim 1, wherein the multiple resource types of the resources are conveyed by a frame with respect to each of the multiple radio links and the method further comprises:
receiving the frame from the control network node.

4. The method according to claim 3, wherein a sequence for performing multiple scheduling loops is preconfigured by the control network node.

5. The method according to claim 1, wherein the successively performing each of the multiple scheduling loops comprises:
determining a scheduling priority for the multiple radio links; and
repeatedly performing the following until no resource with the one or more types is available for allocation or until each of the multiple radio links is allocated sufficient resources:
selecting a radio link that is unscheduled by the scheduling loop and has the highest scheduling priority from the multiple radio links; and
allocating the one or more types of resources to the selected radio link.

6. The method according to claim 5, wherein the determining the scheduling priority for the multiple radio links comprises calculating the scheduling priority based on one or a combination of the following coefficients associated with the multiple radio links:
traffic handling priorities;
link channel quality;
link fairness;
link delay; and
link minimum rates.

7. The method according to claim 6, wherein the coefficients associated with the multiple radio links comprise one or more of the following factors associated with the previously scheduled radio links:
   a transmitter buffer status updated based on the resource allocation results from the one or more previous scheduling loops;
   a data rate obtained from previous transmissions and scheduled transmissions based on the resource allocation results from the one or more previous scheduling loops; and
   a service type after scheduled based on the resource allocation results from the one or more previous scheduling loops.

8. The method according to claim 1, wherein the unused resource type is a dedicated resource with respect to a first link and is prohibitive for utilization by a second link during the initial decision of the control network node, and wherein the unused resource type is temporarily available for the second link after the resource consideration by the network node.

9. A network node for allocating resources for multiple radio links in a wireless communication system, the network node comprising:
   a processor; and
   a memory, the memory containing instructions executable by the processor, whereby the network node is operative to:
      successively perform each of multiple scheduling loops such that the resources with one or more of multiple resource types are allocated to one or more radio links selected from the multiple radio links,
      wherein performing each of the multiple scheduling loops comprises performing a first scheduling loop, performing a second scheduling loop, and performing a third scheduling loop, wherein the first scheduling loop is associated with one of a dedicated resource type, a shared resource type, and an unused resource type, and the second scheduling loop is associated with a different resource type from the resource type associated with the first scheduling loop, wherein the second scheduling loop is associated with one of the dedicated resource type, the shared resource type, and the unused resource type, and the third scheduling loop is associated with a different resource type from the resource types associated with the first scheduling loop and the second scheduling loop, wherein the third scheduling loop is associated with one of the dedicated resource type, the shared resource type, and the unused resource type,
      wherein the dedicated resource type comprises a resource that is used exclusively by a specific radio link,
      wherein the shared resource type comprises a resource that is shared between different coexisting radio links, and
      wherein the unused resource type comprises a resource that is prohibitive for utilization by a certain link according to an initial decision of a control network node but is temporarily available for the certain link after resource coordination by the network node among multiple radio links.

10. The network node according to claim 9, wherein the number of the scheduling loops is determined based on the number of the resource types.

11. The network node according to claim 9, wherein the multiple resource types of the resources are conveyed by a frame with respect to each of the multiple radio links and the memory further includes instructions which, when executed by the processor, cause the network node to:
    receive the frame from the control network node.

12. The method according to claim 11, wherein a sequence for performing multiple scheduling loops is pre-configured by the control network node.

13. The method according to claim 9, wherein the network node is operative to successively perform each of the multiple scheduling loops by:
    determining a scheduling priority for the multiple radio links; and
    repeatedly performing the following until no resource with the one or more types is available for allocation or until each of the multiple radio links is allocated sufficient resources:
    selecting a radio link that is unscheduled by the scheduling loop and has the highest scheduling priority from the multiple radio links; and
    allocating the one or more types of resources to the selected radio link.

14. The method according to claim 13, wherein the network node is operative to determine the scheduling priority for the multiple radio links by: calculating the scheduling priority based on one or a combination of the following coefficients associated with the multiple radio links:
    traffic handling priorities;
    link channel quality;
    link fairness;
    link delay; and
    link minimum rates.

* * * * *